United States Patent

Draghetti

[11] Patent Number: 6,006,492
[45] Date of Patent: Dec. 28, 1999

[54] MACHINE FOR PACKING GROUPS OF CIGARETTES

[75] Inventor: Fiorenzo Draghetti, Medicina, Italy

[73] Assignee: G.D. Societa'Per Azioni, Bologna, Italy

[21] Appl. No.: 09/099,350

[22] Filed: Jun. 18, 1998

[30] Foreign Application Priority Data

Jun. 20, 1997 [IT] Italy ............................ B097A 0375

[51] Int. Cl.⁶ .................................................. B65B 19/04
[52] U.S. Cl. .............................. 53/148; 53/151; 131/283
[58] Field of Search ........................ 53/148, 149, 150, 53/151; 131/282, 283

[56] References Cited

U.S. PATENT DOCUMENTS

| | | | |
|---|---|---|---|
| 3,448,846 | 6/1969 | Bardenhagen | 53/150 X |
| 3,479,787 | 11/1969 | Bardenhagen et al. | 53/148 X |
| 3,520,394 | 7/1970 | Seragnoli | 53/151 X |
| 4,079,575 | 3/1978 | Focke et al. | 53/148 X |
| 4,095,396 | 6/1978 | Seragnoli | 53/148 X |
| 4,330,976 | 5/1982 | Blackall et al. | 53/151 |
| 4,364,464 | 12/1982 | Manservisi et al. | 53/151 X |
| 4,607,477 | 8/1986 | Hinchcliffe et al. | 53/148 X |
| 4,614,263 | 9/1986 | Nagata et al. | 53/151 X |
| 4,631,904 | 12/1986 | Nagata et al. | 53/149 X |
| 4,735,032 | 4/1988 | Focke | 53/148 X |
| 4,750,607 | 6/1988 | Focke | 53/148 X |
| 5,299,679 | 4/1994 | Obara et al. | 53/151 X |

FOREIGN PATENT DOCUMENTS

| | | |
|---|---|---|
| 0210531 | 2/1987 | European Pat. Off. . |
| 2032184 | 2/1971 | Germany . |
| 1570605 | 7/1980 | United Kingdom . |
| 2138382 | 10/1984 | United Kingdom . |
| WO9821097 | 6/1998 | WIPO . |

*Primary Examiner*—Daniel B. Moon
*Attorney, Agent, or Firm*—Marshall, O'Toole, Gerstein, Murray & Borun

[57] ABSTRACT

A machine for packing groups of cigarettes, wherein a step-operated first conveying device, having a pocket conveyor belt, a transmission pulley rotating about an axis of rotation, and a number of first conveying pockets, receives a given number of groups of cigarettes during a stop period, and feeds the groups, during a transfer period, to a continuous second conveying device having second conveying pockets and, for the second conveying pockets, a conveyor drum rotating about the axis of rotation; the first and second conveying pockets being aligned with each other and moving at the same speed during the transfer period.

6 Claims, 2 Drawing Sheets

MACHINE FOR PACKING GROUPS OF CIGARETTES

BACKGROUND OF THE INVENTION

The present invention relates to a machine for packing groups of cigarettes.

British Patent No. 2,138,382 relates to a machine for packing groups of cigarettes, which comprises a cigarette hopper with at least two outlets for respective groups of cigarettes; step-operated first conveying means, in turn comprising a pocket conveyor belt looped about two transmission pulleys defining, on the conveyor belt, an unloading branch, and a loading branch extending past the hopper outlets, and a number of first conveying pockets for respective groups of cigarettes equally spaced along the conveyor belt; reciprocating loading means which move through the hopper outlets to expel the groups of cigarettes from the outlets and feed the groups to the first conveying pockets; and continuous second conveying means with a number of second conveying pockets which travel through a loading station, located along the unloading branch of the first conveying means, to receive the groups of cigarettes from the first conveying pockets.

In the above patent, the second conveying means comprise a further endless conveyor belt, which supports the second conveying pockets equally spaced like the first conveying pockets, and which has a respective conveying branch extending through the loading station to the side of the unloading branch to enable, at each continuous operating period of the first conveying means, alignment of the first and second conveying pockets, and transfer of the groups of cigarettes from the first to the second conveying pockets.

The above known packing machine has several technical drawbacks which, with use, seriously impair the efficiency of the machine. That is, however well made using technically advanced materials, the endless conveyor belts are inevitably subject—due to wear and changing environmental conditions—to dimensional variations affecting, at times irreparably, the precise alignment of the first and second conveying pockets required to transfer the groups of cigarettes along the loading station. Moreover, though means are provided for correcting such dimensional variations, the situation is further compounded by the difficulty in restoring to optimum efficiency two conveying means operating structurally independently of each other.

EP-A-210531 discloses a machine for packing groups of cigarettes, which partially overcomes the aforementioned drawbacks and comprises a pocket conveyor having a plurality of pockets, which are designed for receiving respective groups of cigarettes and are advanced along a closed path and through a receiving station, wherein each pocket cooperates with the outlets of a hopper for receiving a relevant group of cigarettes, and a feeding station, wherein each pocket cooperates with a respective seat of a motorized wrapping wheel, around which the pocket conveyor is wound, for feeding the relevant group of cigarettes to the seat. The pocket conveyor has two opposite end pulleys, which divide the pocket conveyor into a lower branch, at which the receiving station is arranged, and an upper branch, at which the feeding station is arranged. The two opposite end pulleys are movable to and from each other to allow the pocket conveyor to advance continuously along the upper branch in phase with the continuously rotating wrapping wheel, and to allow the pocket conveyor to step-advance along the lower branch for cooperating with reciprocating loading means movable through the outlets of the hopper. The pocket conveyor has no belt and is designed to be substantially free of wear and of play.

The above known packing machine partially overcomes the aforementioned drawbacks, but is relatively complicated, and therefore expensive, owing to a branch of the pocket conveyor being continuously advanced and another branch of the pocket conveyor being step-advanced.

SUMMARY OF THE INVENTION

It is an object of the present invention to provide a machine for packing groups of cigarettes, designed to overcome the aforementioned drawbacks in a straightforward low-cost manner.

According to the present invention, there is provided a machine for packing groups of cigarettes, the machine comprising a first given number of outlets for respective groups of cigarettes; step-operated first conveying means, in turn comprising a pocket conveyor belt, a transmission pulley for said belt and step-rotating about an axis of rotation, and a number of first conveying pockets arranged along said belt with a given spacing and movable along a path extending frontally past said outlets; reciprocating loading means movable through said outlets and crosswise to said path to expel the groups of cigarettes from the outlets and feed the groups to said first conveying pockets; and continuous second conveying means having a number of second conveying pockets movable through a loading station, located along said path, to receive the groups of cigarettes from said first conveying pockets; the machine being characterized in that the second conveying means comprise, for said second conveying pockets, a conveyor drum mounted for continuous rotation about the axis of rotation of said pulley and to the front of the pulley; said second conveying pockets being arranged along a periphery of the drum with a spacing equal to said given spacing.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
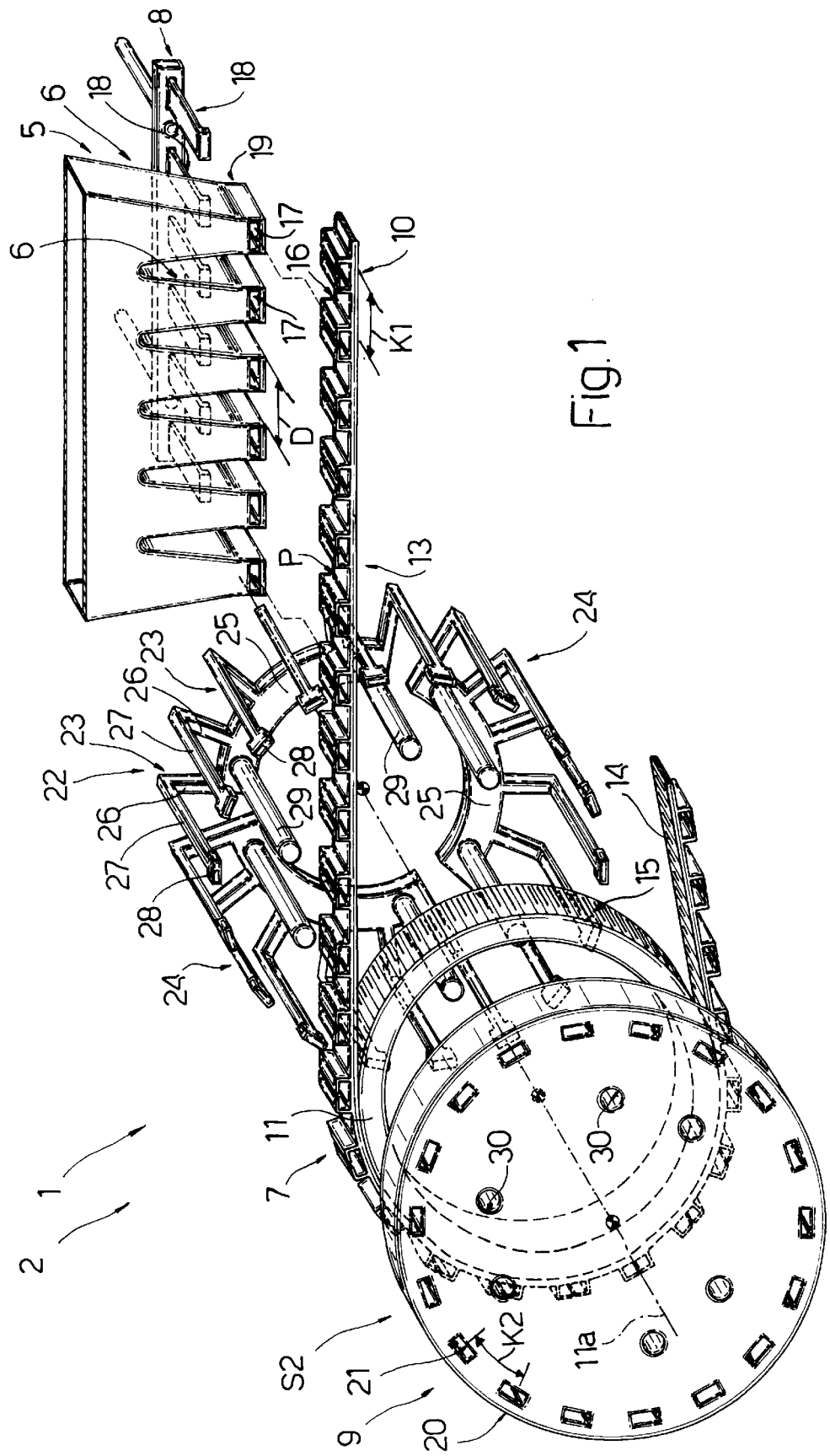
FIG. 1 shows an exploded view in perspective, with parts removed for clarity, of a preferred embodiment of a packing machine in accordance with the present invention.
Figure 2:
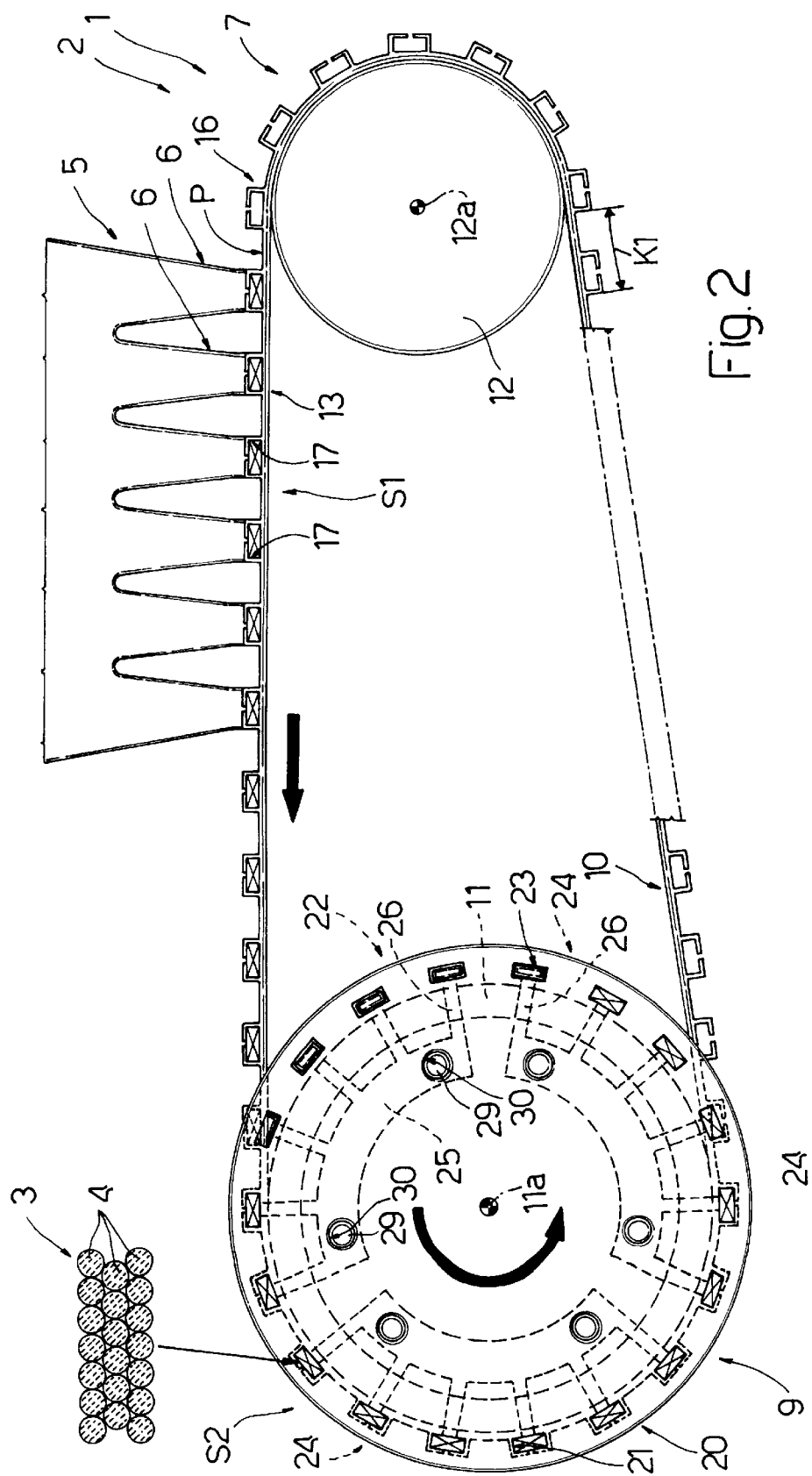
FIG. 2 shows a side view of the FIG. 1 machine with parts removed for clarity.

Number 1 in FIGS. 1 and 2 indicates an input portion of a machine (indicated as a whole by 2) for packing groups 3 of cigarettes 4.

Portion 1 comprises a hopper 5 for cigarettes 4, having a given N1 number of outlets 6 for respective groups 3; a step-operated conveying device 7 for receiving groups 3 from outlets 6; a loading device 8 moving back and forth through outlets 6 to expel groups 3 from outlets 6 and feed groups 3 to conveying device 7; and a continuous conveying device 9 connected to conveying device 7 to receive groups 3 from conveying device 7 at a transfer station S2.

Conveying device 7 comprises a conveyor belt 10 looped about two pulleys 11 and 12 rotating about respective axes of rotation 11a and 12a and defining, on belt 10, a loading branch 13 facing outlets 6 and traveling along a given path P extending through transfer station S2 and through a loading station S1 located upstream from station S2 and defined, along path P, by outlets 6. Conveyor belt 10 is defined by a toothed belt having, along the inner side, a number of transverse teeth 14 meshing with respective grooves 15 formed along the peripheries of pulleys 11 and 12, and, along the outer side, a number of conveying pockets 16, which form part of conveying device 7, are arranged along belt 10 with a given spacing K1, and each receive a respective group 3 at station S1 to feed group 3 along path P and crosswise to respective cigarettes 4.

Outlets 6 are arranged side by side and have respective bottom openings 17 through which to expel groups 3, and which are positioned vertically along path P at station S1, are separated from one another by a given distance D equal to spacing K1, and each have an inner cross section substantially similar to a cross section of pockets 16. Loading device 8 is located on the opposite side of openings 17 with respect to loading branch 13 of belt 10, and comprises, for each outlet 6, a push element 18 movable back and forth through respective opening 17 and through a respective opening 19 aligned with opening 17 at the bottom of outlet 6, to engage a group 3 longitudinally and feed the group 3 into a respective pocket 16 arrested opposite opening 17.

Conveying device 9 comprises a conveyor drum 20 mounted for rotation about axis 11a of pulley 11 and in front of pulley 11; and an N2 number of further conveying pockets 21 equally spaced along a periphery of drum 20 with a spacing K2 equal to spacing K1 of pockets 16. More specifically, drum 20 is supported for rotation by a drive shaft (not shown) of pulley 11 to rotate continuously about axis 11a; the N2 number of pockets 21 is equal to a whole multiple of the N1 number of outlets 6; and pockets 16 and 21 have the same cross section, and are arranged about axis 11a along respective circumferences with the same diameter.

Conveying device 9 also comprises a loading device 22, which is angularly integral with drum 20, is mounted substantially on the opposite side of pulley 11 to drum 20, and has a number of loading elements 23 equally spaced about axis 11a and equal in number to the N2 number of pockets 21.

Loading elements 23 are divided into an N3 number of loading assemblies 24, which each comprise a number of elements 23 equal to the N1 number of outlets 6, and define about axis 11a an N2 number of annular sectors defined by respective supporting plates 25 located on the opposite side of pulley 11 to drum 20, and having, for each loading element 23, a radial arm 26 connected to plate 25, and an axial arm 27 connected to respective arm 26 and extending, parallel to axis 11a, from arm 26 towards drum 20 to support a respective substantially parallelepiped head 28 which, together with arms 26 and 27, defines loading element 23. Each plate 25 also has two cylindrical rods 29 which extend, parallel to axis 11a, through pulley 11 from respective opposite ends of plate 25, and engage in axially-sliding manner respective through holes 30 formed in drum 20.

Plates 25 are activated independently of one another by a known actuating device (not shown), and are movable parallel to axis 11a to insert heads 28 inside pockets 16 along transfer station S2, to unload groups 3 from respective pockets 16, and to feed groups 3 into pockets 21 aligned with pockets 16.

In actual use, conveyor drum 20 rotates continuously about axis 11a to feed conveying pockets 21 through station S2 at a given surface speed V1; while conveying device 7 is activated by a known central control unit (not shown) to perform an operating cycle comprising a stop period in which conveyor belt 10 is arrested to load groups 3 from hopper 5, and a transfer period in which, after an initial transient stage, conveyor belt 10 is fed forward at a speed V2 equal to the surface speed V1 of drum 20 to unload groups 3 onto drum 20.

More specifically, during the stop period, N1 number of pockets 16 are arrested in front of outlets 6 and aligned with bottom openings 17, and are loaded with groups 3 expelled from outlets 6 by push elements 18 moving simultaneously through all of openings 19 and 17. Once pockets 16 are loaded with respective groups 3 of cigarettes 4, the control unit brings conveyor belt 10 up to speed V2 with a given movement depending on geometric factors such as the N1 number of outlets 6, and on dynamic factors such as the size of drum 20.

According to one possible movement, the control unit accelerates belt 10 to a speed higher than speed V1 of drum 20 until pockets 16 containing groups 3 overtake, along path P, pockets 21 awaiting groups 3; and belt 10 is then decelerated to speed V2 to enable alignment, parallel to axis 11a, of pockets 16 and 21. At this point, belt 10, by now at transfer station S2, is advanced at speed V2 throughout the transfer period, during which, only the loading assembly 24 corresponding to the pockets 21 to be loaded is activated: respective plate 25 is moved parallel to axis 11a so that heads 28 penetrate pockets 16 to engage, expel and feed groups 3 immediately into pockets 21; plate 25 is then moved in the opposite direction to withdraw heads 28 from pockets 16; and belt 10 is slowed down to zero speed.

The groups 3 loaded onto drum 20 form a continuous succession of groups 3 inside pockets 21 until a known unloading device (not shown) fitted to drum 20 unloads groups 3 from pockets 21 onto a known wrapping device.

In the embodiment described above, the N1 number of outlets 6 equals six, and the N2 number of conveying pockets 21 on drum 20 equals eighteen, so that the N3 number of assemblies 24 equals three. Depending on the required output of machine 2, and on the dimensions, dynamic conditions and linkages involved, numbers N1, N2 and N3 may be varied in any manner proportional to one another.

During the period in which groups 3 of cigarettes 4 are transferred from pockets 16 to pockets 21, alignment of pockets 16 and 21 is therefore guaranteed at all times, by both first pockets 16 and, especially, second pockets 21 being supported rigidly throughout transfer station S2, thus ensuring perfect and constant alignment of pockets 16 and 21.

I claim:

1. A machine for packing groups of cigarettes, the machine comprising:

a feeding station having a first given number (N1) of outlets (6) for respective groups (3) of cigarettes (4);

a transmission pulley (11) rotating about an axis (11a) of rotation;

a pocket conveyor belt (10) wound around said transmission pulley (11) and arranged along a path (P) extending through said feeding station;

a number of first conveying pockets (16) arranged along said belt (10) with a given spacing (K1) and movable along said path (P);

reciprocating loading means (8) arranged at said feeding station and movable through said outlets (6) and crosswise to said path (P) to expel the groups (3) of cigarettes (4) from the outlets (6) and feed the groups (3) to said first conveying pockets (16);

a conveyor drum (20) mounted for rotation about said axis (11a) of rotation of said transmission pulley (11);

a number of second conveying pockets (21) arranged along a periphery of the drum (20) with a spacing (K2) equal to said given spacing (K1);

a transfer station (S2) located along a portion of said path (P) and in correspondence with said conveyor drum (20);

first conveying means (9) for continuously rotating said conveyor drum (20) and feeding said second conveying pockets (21) through said transfer station (S2) with a first constant speed (V1);

second conveying means (7) for step-moving said conveyor belt (10) and advancing said first conveying pockets (16) along said path (P) at a second variable speed having a zero-value at said feeding station and a value (V2) equal to said first constant speed (V1) at said transfer station (S2);

means for aligning and synchronizing said first conveying pockets (16) with said second conveying pockets (21) at said transfer station (S2); and a number of loading elements (23) rotating synchronously with said drum (20) and movable axially with respect to the drum (20) for transferring said groups (3) from said first conveying pockets (16) to said second conveying pockets (21).

2. A machine as claimed in claim 1, wherein said first conveying means (9) comprises a second given number (N2) of said second conveying pockets (21) equal to a whole multiple of said first given number (N1).

3. A machine as claimed in claim 2, wherein said loading elements (23) are equally spaced about said axis (11a) of rotation, and are equal in number to said second given number (N2).

4. A machine as claimed in claim 3, wherein said loading elements (23) are divided into groups, each of which comprises a third given number (N3) of loading assemblies (24); each said group of loading assemblies (24) being actionable independently from the other group at said transfer station (S2).

5. A machine as claimed in claim 4, wherein each said loading assembly (24) comprises a number of loading elements (23) equal to said first given number (N1).

6. A machine as claimed in claim 4, wherein said second conveying means (7) are activated to perform an operating cycle comprising a stop period in which said first conveying pockets (16) are aligned with said outlets (6) to receive respective groups (3) of cigarettes (4), and a transfer period in which the first conveying pockets (16) containing respective groups (3) of cigarettes (4) are aligned with said second conveying pockets (21), and move together with the second pockets (21) through said transfer station (S2).

* * * * *

UNITED STATES PATENT AND TRADEMARK OFFICE
CERTIFICATE OF CORRECTION

PATENT NO. : 6,006,492
DATED : December 28, 1999
INVENTOR(S) : FIORENZO DRAGHETTI It is certified that error appears in the above-identified patent and that said Letters Patent is hereby corrected as shown below:

Title page, item [73] should read as follows:
   Assignee: G.D Societa' Per Azioni, Bologna, Italy Signed and Sealed this Twenty-fourth Day of October, 2000

Attest:

Q. TODD DICKINSON

*Attesting Officer*      *Director of Patents and Trademarks*